Jan. 24, 1956  A. E. R. ARNOT  2,732,088
AIRCRAFT HANDLING DEVICES
Filed May 6, 1952  4 Sheets-Sheet 1
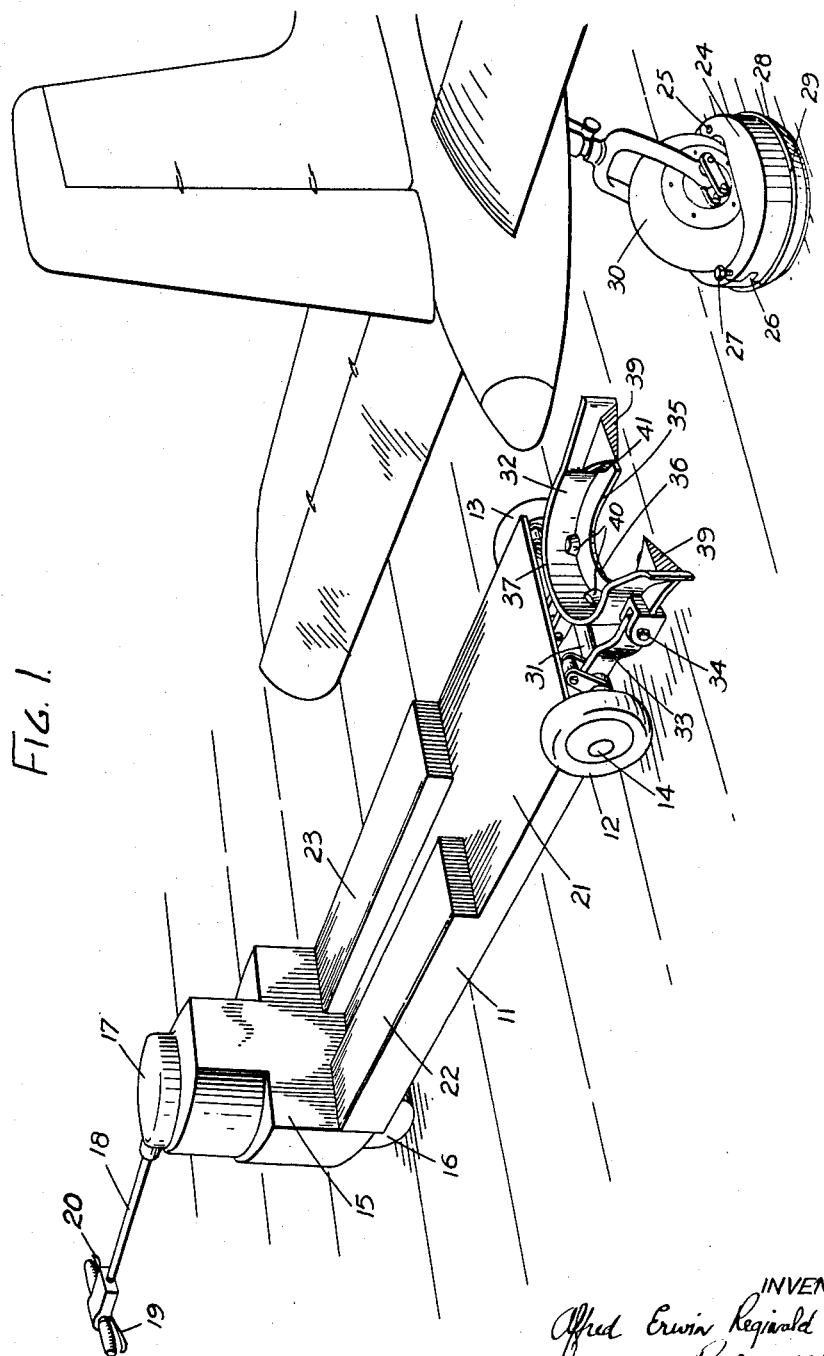
INVENTOR:
Alfred Erwin Reginald Arnot
BY: Rowland V. Patrick
ATTORNEY:

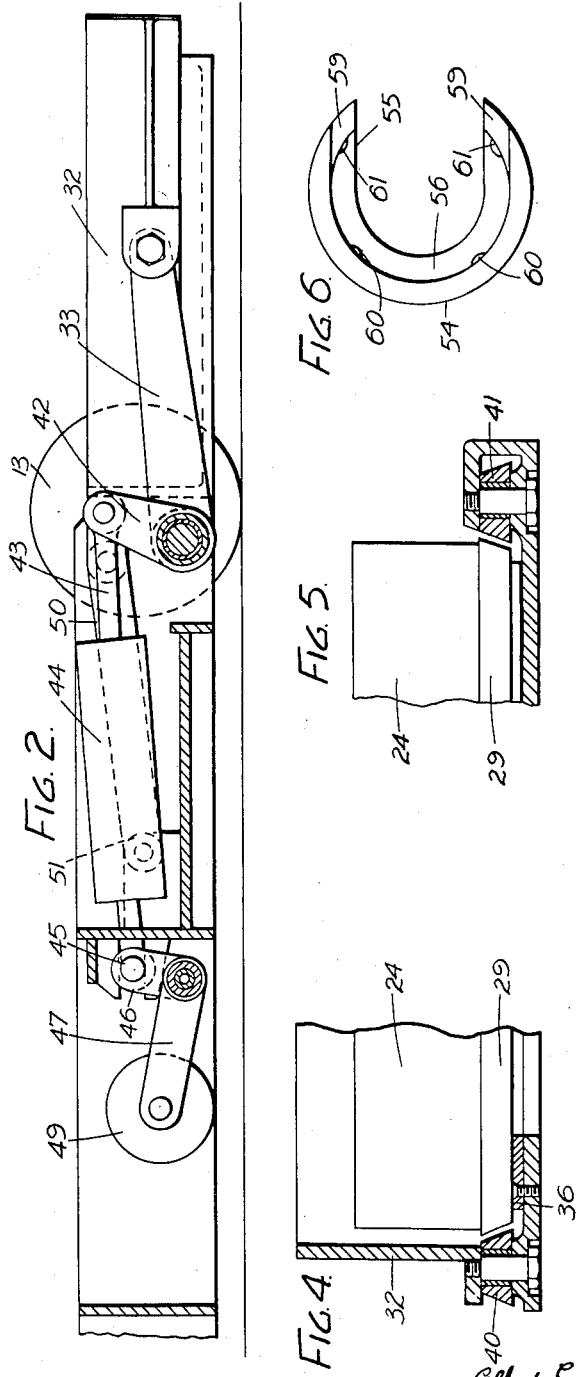

Jan. 24, 1956     A. E. R. ARNOT     2,732,088
AIRCRAFT HANDLING DEVICES
Filed May 6, 1952     4 Sheets-Sheet 3
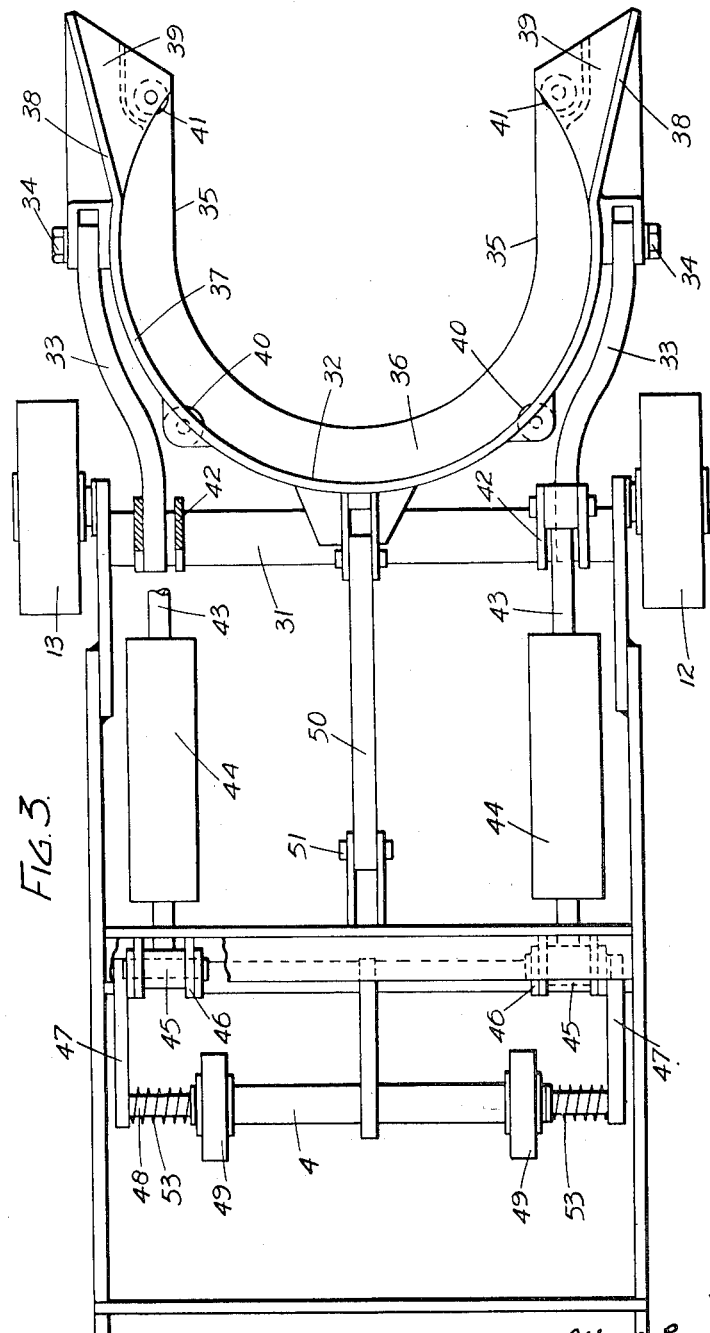
INVENTOR:
Alfred Erwin Reginald Arnot
BY: Rowland V. Patrick
ATTORNEY:

Jan. 24, 1956  A. E. R. ARNOT  2,732,088
AIRCRAFT HANDLING DEVICES
Filed May 6, 1952  4 Sheets-Sheet 4

*Fig. 7.*

INVENTOR
ALFRED ERWIN REGINALD ARNOT
BY Rowland V. Patrick
ATTORNEY

United States Patent Office 2,732,088
Patented Jan. 24, 1956

2,732,088
AIRCRAFT HANDLING DEVICES

Alfred Erwin Reginald Arnot, Basingstoke, England, assignor to John Reginald Sharp and Emmanuel Kaye, Basingstoke, England Application May 6, 1952, Serial No. 286,382

10 Claims. (Cl. 214—332)

This invention comprises improvements in or relating to aircraft handling devices, and relates to aircraft handling operations in which it is necessary to manoeuvre one or more of the aircraft wheels by lifting on to a truck or platform and subsequently moving by manual or mechanical power. In such cases it is a desirable feature that the handling device should be able to approach and pick up the wheel from any angle and that it should complete all its manoeuvres with the wheel remaining locked in the fore-and-aft direction.

It is an object of the present invention to afford satisfactory means for raising the aircraft wheel on to a truck or platform and means for allowing relative rotation between the truck and aircraft wheel.

The present invention comprises a device for handling aircraft, having in combination a truck mounted on wheels and provided with means for steering, an attachment-member for attachment to a suitable lifting-point on an aircraft, a lifting-member on the truck adapted to engage and fit below the attachment-member, and lifting means on the truck to raise the lifting-member and with it the attachment member and aircraft from the ground.

The invention further comprises a device for handling aircraft having in combination a truck mounted on wheels and provided with means for steering, a divided ring-member capable of assembly around a portion of an aircraft undercarriage which it is desired to lift, a lifting-member on the truck having an opening in the front which member is shaped to fit beneath and around the ring-member, and lifting means on the truck to raise the lifting-member and with it the ring and aircraft undercarriage from the ground.

With such a device, after the ring or other attachment-member has been positioned in engagement with the aircraft the truck can be driven towards it so that the lifting-member on the truck engages beneath and fits the attachment-member, after which the lifting-means on the truck is operated and thereafter the aircraft can be manoeuvred by appropriately manoeuvring the truck.

The lifting-member is preferably provided with guides on each side and behind for directing it on to the ring in the event of the truck not being perfectly accurately positioned so as to be exactly centred upon the ring. To cooperate with the guides there may be provided a subsidiary roller or rollers on the truck which are so mounted relatively that they can run upon the ground and support the front end of the truck and the lifting device, but permit a certain lateral movement of the truck relatively to the roller or rollers whereby the guides automatically centre the truck relatively to the ring.

The following is a description by way of example of one construction of aircraft handling truck in accordance with the invention.

In the accompanying drawings:

Figure 1 is a general perspective view,

Figure 2 is a vertical longitudinal section through the front part of the truck shown in Figure 1, Figure 3 is a plan of the same with the upper cover of the truck removed, Figures 4 and 5 are details of parts of the lifting device on the truck shown in position relatively to the ring which they engage, Figure 6 is a plan of an adaptor to enable the truck to take smaller rings, and Figure 7 is an enlarged plan view of the structure of Figure 6.

The truck comprises a long body portion or chassis 11 which is fabricated from welded steel, mainly from sheet metal and is rectangular in plan. At the front end of this chassis are two rubber-tired wheels 12, 13 rotating on stub axles 14. At the rear end is a box-like structure 15 containing a turntable 17 and an electrically driven castor wheel 16 on which the rear end of the truck rests. The castor wheel is controlled by a tiller handle 18 on the turntable and appropriate control levers 19, 20 are carried by the tiller handle. The portions 22, 23 of the truck floor 21 which lies nearest to the castor wheel are made a little deeper than the front end of the floor and being of box-shape serve to house electric batteries for driving the truck by means of a motor within the turntable 17, which is geared to the castor wheel 16.

A ring 24 is provided consisting of light alloy metal in two parts hinged together at 25 on one side of the ring and provided with an interlocking connection 26 at the other side which is fastened by means of a spring-loaded quick-release drop-in pin 27 like a pin joint. The pin 27 has a head for easy removal and if removed the ring can be hinged open. It is shaped internally so as to fit closely round the wheel hubs and carrying fork of the castor wheel of an aircraft undercarriage such as that shown at 30 in the drawing, the two halves of the ring 24 being adapted to fit a desired wheel fork and various rings being provided to fit any desired undercarriage, so that the resultant working height from the ground is constant for all aircraft. The ring 24 can readily be fitted around the undercarriage and when so fitted, if the ring is lifted the undercarriage will be lifted with it. The exterior of the ring comprises a narrow outwardly projecting flange 28 and the underside of the flange is tapered at 29 so as to be conical. As will be readily understood if a number of different types of aircraft are to be dealt with by the same truck a number of different rings will be required, one to fit each type of aircraft castor wheel or the rings may be provided with interchangeable block inserts, or a master pattern to deal with a range of aircraft may be possible in certain cases.

At the front of the truck, close to the two before-mentioned supporting rollers on stub axles there extends across the truck frame from side to side, near to the ground, a cross tube 31 which forms a fixed cross bearing for a lifting-member 32. This tube is located beneath the box-like surface of the truck chassis, which is cut away where necessary, to permit the passage of the parts carried by the cross tube, which are now to be described. On the cross tube at two places, one near each side of the truck, there are pivoted lifting levers 33. The lifting levers 33 normally project forwardly from the truck and are curved as viewed in plan so that they form arms which support between them the lifting-member 32. The lifting-member is a casting which is pivoted upon two shouldered bolts 34 which pass through the lifting-member and the lever arms. As viewed in plan it is semi-circular with a forwardly projecting continuation 35 in front of the pivots forming a mouth into which the aforesaid ring, which is clipped around the undercarriage wheel, can pass.

The lifting member is of angle section, that is to say it comprises a flat bottom flange 36 and an upstanding surrounding flange 37. At the front of the lifting-member the upright surrounding flange is splayed outward as shown at 38, Figure 3, and in the splayed portion above the level of the main horizontal flange are two small flanges which form ramps 39, that is to say, they commence at a level which is substantially ground level if the lifting-member is resting on the ground, and they slope upwardly and rearwardly to a point overlying the mouth 35 of the main flange 36. A number of conical rollers 40 are disposed at the back of the main flange on upright spindles and there are two conical rollers 41 in the space beneath the ramps and above the main flange, all these rollers being arranged so that they are in a circle which will fit around the conical underside of the ring 24 which surrounds the aircraft undercarriage part. The effect is that if the truck is driven towards the aircraft undercarriage with the ring 24 surrounding it and the lifting-member 32 resting close to the ground or deck, the ramps 39 pass beneath the ring, which is guided by flanges 38 into the opening of the flanged lifting-member until it comes above the horizontal lower flange 36 of the lifting-member. There it remains behind the ramps with its conical under-surface 29 concentric with the four conical rollers 40, 41 above described until the lifting member is raised. When so raised, the rollers form an anti-friction bearing for the ring, which enables it to resist horizontal forces and to rotate readily relatively to the truck, and at the same time prevents it from becoming detached therefrom. Lubricated pads or horizontal rollers (not shown) may also be provided on the main bottom flange 36 to support the weight.

The two levers 33 upon which the lifting-member is mounted are each formed as bell crank levers with an upstanding arm 42 projecting from the hub of the lever on the tubular cross member 31 of the truck (see Figure 2). These upstanding arms 42 are made as long as is permissible while keeping within the depth of the truck chassis. The upper end of each of the arms is connected to the piston rod 43 of a hydraulic jack 44 located within the chassis and supply of hydraulic pressure to the front end of the two jacks will rotate the levers 42, 33 of the lifting-member 32 and raise the lifting-member from the ground, at the same time bringing it over, or even past, the axis of the front wheels 13 of the truck. In this position the truck can be manoeuvred and will carry the tail or front end of the aircraft as the case may be into any desired position, and thereafter can be used to propel or repel the aircraft as a whole over the ground if the castor wheel 16 at the other end of the truck is used to bring the truck into line with the fuselage of the aircraft. In short the operator has complete control over the aircraft. Moreover the design permits of a narrow vehicle due to the pick-up attachment being normally ahead of, instead of between, the truck wheels, whilst the lifting action places the axis of the ring either exactly over the point of true articulation, or slightly nearer to the castor wheel 16, so that some of the aircraft weight is thrown on to the driving wheel 16 to provide better adhesion.

It is desirable when the lifting-member 32 is lifted that it should be positively prevented from canting. To this end the rear of the upright flange 37 of the lifting-member is connected by a pivoted link 50 to a lug 51 on the frame, and the link is made of the same length as the lifting levers 33, and parallel to them. This makes the lifting-member move parallel to itself.

It is furthermore desirable that the truck should be able to centre itself relatively to the ring 24 around the aircraft castor wheel when it is to be advanced to engage the same. To this end the remote ends of the jacks 44 on the truck which operate the lifting levers are pivoted at 45 upon bell-crank members 46 arranged beneath the body of the truck. The bell crank members have arms 47 which extend rearwardly beneath the truck body and support between them a non-rotatable cross axle 48. On the cross axle there are slidably mounted two light rollers 49 and these rollers are urged into a neutral position along the axle by centering springs 53. Each of the jacks 44 is double-acting. When the truck is advanced towards the ring the jack is energised so as to push its piston and piston rod forwardly and lower the levers which carry the lifting member so that the lifting-member approaches very close to the ground or deck being stopped by a preset abutment. The reaction of this force urges the body of the jack rearwardly and causes it to operate the bell crank levers 46, 47 which carry the light rollers 49. These rollers are therefore pressed downwardly against the ground and the front end of the truck is lifted off the main weight carrying rollers 12, 13. When the lifting-member engages the ring with its arms, if it is not quite centred upon it, it will push the truck sideways until it is centered and this movement is facilitated by the ability of the light rollers to slide along their axle 48 against the centering springs 53. This mechanism avoids the necessity which would otherwise exist for the main rollers being made to slip sideways on the ground which might in some cases require an undue amount of force. As soon as the lifting member has properly engaged the ring and the ring is above the conical rollers, the hydraulic pressure is reversed the lifting jack is contracted and this has the effect not only of lifting the lifting-member, but of dropping the truck carriage so that it rests again upon the main rollers 12, 13, the light rollers 49 being lifted off the ground. As will readily be appreciated, instead of the light rollers being mounted to slide upon the cross axle and provided with centering springs they might take the form of light castor wheels, but a castor wheel construction is not so good on ground which slopes laterally because it may allow the whole front of the truck to swing round when the castors are lowered, unless other means are provided to restrain such movement.

It will be understood that during lifting the pick-up member 32 moves upwardly and rearwardly so that relative freedom of horizontal movement between the aircraft and truck must be permitted.

A suitable shock-absorber or weak-link device may be incorporated between the drive unit portion of the truck and the front pick-up member carrying frame to prevent the application of heavy forces or shock loads to the aircraft.

Figure 6 and Figure 7 show an adaptor which may be inserted in the lifting-member 32 and which is provided with an open mouth portion 55 and a lower flange 56 corresponding to the mouth 35 and flange 36 of the lifting-member itself. This member carries ramp portions 59 to act as continuations of the ramp portions 39 of the lifting-member and it has anti-friction rollers 60, 61 and is adapted to fit a smaller size of ring than the ring 24. External flanges 62 locate against the guide flanges 38 to prevent rotation of the adaptor. The effect is to enable the smaller sizes of aircraft to be dealt with by the same truck as that which deals with the larger sizes, but owing to the fact the rollers 60, 61 are at a smaller radius than the rollers 40, 41, they do not by friction produce so much twisting effort on the undercarriage of the smaller aircraft. In this way the smallest ring compatible with the size of the aircraft to be dealt with can be used, and the effort required to operate the apparatus reduced to a minimum in the case of all but the largest aircraft, and yet by taking away the adaptor the largest size of rings can be accommodated, for dealing with the largest aircraft, when the necessity arises.

I claim:

1. A device for handling aircraft having in combination a truck mounted on wheels in fixed axes at one end and provided with a steering wheel at the other end, a divided ring-member capable of assembly around a portion of an aircraft undercarriage which it is desired to lift, a lifting member on the truck between the wheels which are in fixed axes which lifting member has an opening in the front and is shaped to fit beneath and around the ring-member bearing elements on the lifting member which permit relative rotation between the lifting member and ring-member and lifting means on the truck to raise the lifting-member and with it the ring and aircraft undercarriage from the ground.

2. A device as claimed in claim 1 wherein the divided ring member is provided with a removable insert.

3. A device for manoeuvring aircraft on the ground having in combination a chassis having at one end a steerable mounting for a driving wheel and means on the mounting for driving the driving wheel, non-steering side wheels at the other end of the chassis, a lifting member having a circular recess with an opening on the front side thereof on the chassis between the side wheels, a member for engaging a part of the aircraft to be manoeuvred, which latter member has a divided ring to be received in said circular recess by entry through said opening for rotatable engagement with said lifting member, and means on the chassis for raising the lifting member relatively thereto.

4. A device as claimed in claim 3 wherein the parts of the ring-member are hinged to one another at one side of the ring and united by a readily securable fastening at the other.

5. A device as claimed in claim 3 wherein the lifting-member is provided with guides on each side for directing it on to the ring when the truck is advanced towards the same.

6. A device as claimed in claim 3 wherein a subsidiary roller or rollers are provided on the truck which are so mounted that they can be moved relatively to the chassis to run upon the ground and lift the front wheels therefrom, which subsidiary rollers permit lateral movement of the truck relatively to the rollers for centering purposes.

7. A device as claimed in claim 3 wherein anti-friction rollers are provided around the circular flange for the purpose described.

8. A device as claimed in claim 3 wherein the lifting-member is provided with an adaptor to fit within it, which adaptor is shaped similarly to the interior of the lifting-member and is of such size as to be suitable to fit a smaller ring than that fitted by the lifting member itself for the purpose described.

9. A device as claimed in claim 6 wherein means is provided to permit lateral movement of the truck relatively to the rollers which support it when the guides afford a centering force thereon.

10. A device as claimed in claim 6 wherein the means for lowering the subsidiary rollers to the ground consists of a roller-carrying mechanism which is connected to the lifting-means on the truck for operating the lifting member so that when the lifting means is fully lowered the subsidiary rollers are also lowered, and when the lifting means is raised the subsidiary rollers are raised.

References Cited in the file of this patent

UNITED STATES PATENTS

| | | |
|---|---|---|
| 1,647,268 | Buffington | Nov. 1, 1927 |
| 2,120,042 | Remde | June 7, 1938 |
| 2,209,356 | Schreck | July 30, 1940 |
| 2,240,723 | Stoehr | May 6, 1941 |
| 2,327,583 | Fromhein | Aug. 24, 1943 |
| 2,494,725 | Schwitzer | Jan. 17, 1950 |
| 2,550,219 | Bollinger | Apr. 24, 1951 |